US012513441B2

(12) United States Patent
Moroni

(10) Patent No.: US 12,513,441 B2
(45) Date of Patent: Dec. 30, 2025

(54) DRUM-MOUNTED FURNITURE-GRADE SPEAKER DRIVER SYSTEM AND ASSOCIATED METHODS

(71) Applicant: Laurence Salvatore Moroni, Satellite Beach, FL (US)

(72) Inventor: Laurence Salvatore Moroni, Satellite Beach, FL (US)

( * ) Notice: Subject to any disclaimer, the term of this patent is extended or adjusted under 35 U.S.C. 154(b) by 136 days.

(21) Appl. No.: 18/096,925

(22) Filed: Jan. 13, 2023

(65) Prior Publication Data

US 2023/0388685 A1 Nov. 30, 2023

Related U.S. Application Data

(60) Provisional application No. 63/299,330, filed on Jan. 13, 2022.

(51) Int. Cl.
*H04R 1/02* (2006.01)

(52) U.S. Cl.
CPC ....... *H04R 1/025* (2013.01); *H04R 2201/029* (2013.01)

(58) Field of Classification Search
None
See application file for complete search history.

(56) References Cited

U.S. PATENT DOCUMENTS 6,982,376 B2 * 1/2006 Wise ...................... G10H 3/146
84/723

* cited by examiner

*Primary Examiner* — Fan S Tsang
(74) *Attorney, Agent, or Firm* — George Philip Zies

(57) ABSTRACT

A drum-mounted furniture-grade speaker driver system comprising at least one drum shell, at least one drumhead, at least one speaker driver, and at least one reinforcement ring. The at least one drumhead is mounted in an opening of the drum shell. The at least one speaker driver is mounted in an opening in the at least one drumhead. The at least one reinforcement ring is sized to span an area between an interior perimeter of the opening in the at least one drumhead and an outer perimeter of the at least one speaker driver. The at least one speaker driver has at least one electronic speaker terminal thereon. A length of speaker wire electrically connects the at least one speaker driver to an amplifier and the amplifier to at least one terminal on an exterior surface of the at least one drum shell.

10 Claims, 9 Drawing Sheets

DRUM-MOUNTED FURNITURE-GRADE SPEAKER DRIVER SYSTEM AND ASSOCIATED METHODS

RELATED APPLICATIONS

The present application claims the benefit of U.S. Provisional Patent Application Ser. No. 63/299,330 titled DRUM-MOUNTED FURNITURE-GRADE SPEAKER DRIVER SYSTEM AND ASSOCIATED METHODS filed by the inventor of the present invention on Jan. 13, 2022, the entire contents of which are incorporated herein by reference.

FIELD OF THE INVENTION

The present invention relates generally to speaker systems and, more particularly, to a drum shell used as a speaker housing with a speaker driver mounted on a reinforced drumhead and risers used to create vibration isolation and an air gap for sound to escape and to be directed into the listening area while also using the drum shell as a furniture base.

BACKGROUND

Typically, speaker manufacturers use a boxy-looking housing for a speaker driver with little thought given to the appearance of the speaker housing. Similarly, speaker manufacturers typically expend little effort to isolate the speaker housing from the vibrations from the speaker driver frame, resulting in cabinet resonance sound distortion or resonant feedback from the cabinet or other components of the speaker cabinet and mounting system.

While such basic speaker cabinets provide a very strong housing for the speaker driver, vibrations and resonances of the speaker frame can transfer to the speaker cabinet. This allows unwanted harmonic distortion and resonances to be transferred to the speaker cabinet.

Advances in the art of speaker systems include U.S. Pat. No. 7,657,051, which describes a speaker apparatus including a drum shell, a drum membrane and an electrically powered speaker. However, this apparatus orients the speaker driver substantially parallel to the floor and involves mounting the speaker on a wooden ring glued and/or attached with fasteners to the drum shell with the speaker output directed towards the opposing drum membrane.

A need exists for an alternative system and method for mounting speaker drivers in speaker housings, which speaker housings may also be utilized as furniture pieces, that may overcome the known shortcomings in the art.

While certain aspects of conventional technologies have been discussed to facilitate disclosure of the invention, the applicant in no way disclaims these technical aspects, and it is contemplated that the claimed invention may encompass one or more of the conventional technical aspects discussed herein. The present invention may address one or more of the problems and deficiencies of the current availability and prior art discussed above. However, it is contemplated that the invention may prove useful in addressing other problems and deficiencies in a number of technical areas. Therefore, the claimed invention should not necessarily be construed as being limited to addressing any of the particular problems or deficiencies discussed herein or as being limited to the particular embodiment for the invention used to illustrate the steps and functionality of the herein disclosed invention.

This background information is provided to reveal information believed by the applicant to be of possible relevance to the present invention. No admission is necessarily intended, or should be construed, that any of the preceding information constitutes prior art against the present invention. This reference or discussion is not an admission that the document, act or item of knowledge, or any combination thereof, was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

With the above in mind, embodiments of the present invention are related to drum-mounted furniture-grade speaker driver systems and processes for assembling drum-mounted furniture-grade speaker driver systems utilizing a unique float-in-head technology. Such drum-mounted furniture-grade speaker driver systems may advantageously expand the commercial usefulness of drum shells while providing a superior speaker driver system wherein the speaker driver is vibration-isolated from the speaker housing and an air gap is provided for sound to escape the speaker housing while at the same time functioning as visually appealing furniture. The products of such systems and processes may advantageously be enjoyed by audiophiles, club owners and music venues that rely on quality high-fidelity sound.

A drum-mounted furniture-grade speaker driver system may comprise at least one hollow cylindrical acoustic drum shell, at least one drumhead, at least one speaker driver, at least one reinforcement ring, at least one electronic speaker terminal and a length of speaker wire. The at least one hollow cylindrical acoustic drum shell may have openings on opposite ends thereof. The at least one drumhead may be mounted in a first opening of the drum shell. The at least one speaker driver may be mounted in the at least one drumhead. The at least one drumhead may have an opening therein sized to accept the at least one speaker driver. The at least one reinforcement ring may be sized to span an area between an interior perimeter of the opening in the at least one drumhead and an outer perimeter of the at least one speaker driver. The at least one speaker driver may have at least one electronic speaker terminal thereon. The length of speaker wire may electrically connect the at least one speaker driver to an amplifier or may connect the amplifier to at least one external terminal on an exterior surface of the at least one drum shell. The drum shell may be selected from the group consisting of a bass drum shell, a floor tom drum shell, a snare drum shell and a rack tom drum shell and the speaker driver may be selected from the group consisting of a subwoofer, a full range speaker driver, and a high frequency dome tweeter speaker driver. The drum-mounted furniture-grade speaker driver system may further comprise at least one drumhead mounted in a second opening of the drum shell opposite the first opening of the drum shell. The at least one drumhead mounted in the second opening of the drum shell may further comprise an opening defined as a port having at least one reinforcement ring adhered to a perimeter of the port. The speaker driver may have an electronic frequency crossover network. The amplifier may be internally powered and may be attached to an outer surface of the drum shell. The drum shell may comprise a bass drum shell oriented vertically so that the first opening is at a top end of the drum shell and the second opening is at a bottom end of the drum shell. The speaker driver may be a subwoofer. A plurality of lugs and a plurality of lug bolts on a perimeter of the top end of the drum shell may secure a mounting ring on the perimeter of the top end of the drum shell to mount the first drumhead in the first opening of the drum shell. A plurality of lugs and a plurality of lug bolts on a perimeter of the bottom end of the drum shell may secure a mounting ring on the perimeter of the bottom end of the drum shell to mount the second drumhead in the second opening of the drum shell. A plurality of mounting support risers may be affixed to a top end of the lug bolts on the perimeter of the top end of the drum shell defined as upper tension rods. A table top may rest on a top surface of the plurality of mounting support risers. A plurality of vibration isolating risers may be affixed to a bottom end of the lug bolts on the perimeter of the bottom end of the drum shell defined as lower tension rods. The at least one reinforcement ring may comprise a first reinforcement ring and a second reinforcement ring, The first reinforcement ring may be adhered to an outer surface of the first drumhead. The second reinforcement ring may be adhered to an inner surface of the first drumhead. The at least one port reinforcement ring may comprise a first port reinforcement ring and a second port reinforcement ring. The first port reinforcement ring may be adhered to an inner surface of the second drumhead. The second port reinforcement ring may be adhered to an outer surface of the second port reinforcement ring. The at least one reinforcement ring may be cut from a 0.06" thick ABS Plastic Sheet. The table top may be tempered glass with a thickness in the range of ¼" to ¾". The risers may be rubber.

A drum-mounted furniture-grade speaker driver assembly method may comprise the steps of cutting at least one reinforcement ring to a diameter and a width of a mounting area of a frame of at least one speaker driver; adhering the at least one reinforcement ring to a first drumhead; cutting the first drumhead to accept the at least one speaker driver; drilling a plurality of mounting holes into the at least one reinforcement ring mounted in the first drumhead, wherein the mounting holes of the reinforcement ring are positioned to match a plurality of mounting holes in the frame of the at least one speaker driver; positioning the at least one speaker driver within the at least one reinforcement ring mounted in the first drumhead; installing a plurality of fasteners through the mounting holes in the frame of the at least one speaker driver and through the mounting holes in the at least one reinforcement ring mounted in the first drumhead; mounting the first drumhead in a first opening of a drum shell; and wiring the speaker driver to an amplifier with a length of speaker wire to accept an audio power output from the amplifier. The at least one reinforcement ring may comprise a first reinforcement ring and a second reinforcement ring and the drum-mounted furniture-grade speaker driver assembly method may further comprise the steps of adhering the first reinforcement ring to an outer surface of the first drumhead and adhering the second reinforcement ring to an inner surface of the first drumhead. The drum-mounted furniture-grade speaker driver assembly method may further comprise the steps of cutting at least one port reinforcement ring, adhering the at least one port reinforcement ring to a second drumhead, and cutting a port in the second drumhead within a diameter of the at least one port reinforcement ring. The at least one port reinforcement ring may comprise a first port reinforcement ring and a second port reinforcement ring and the drum-mounted furniture-grade speaker driver assembly method may further comprise the steps of adhering the first port reinforcement ring to an inner surface of the second drumhead and adhering the second port reinforcement ring to an outer surface of the second port reinforcement ring.

DETAILED DESCRIPTION OF THE INVENTION

Figure 1:
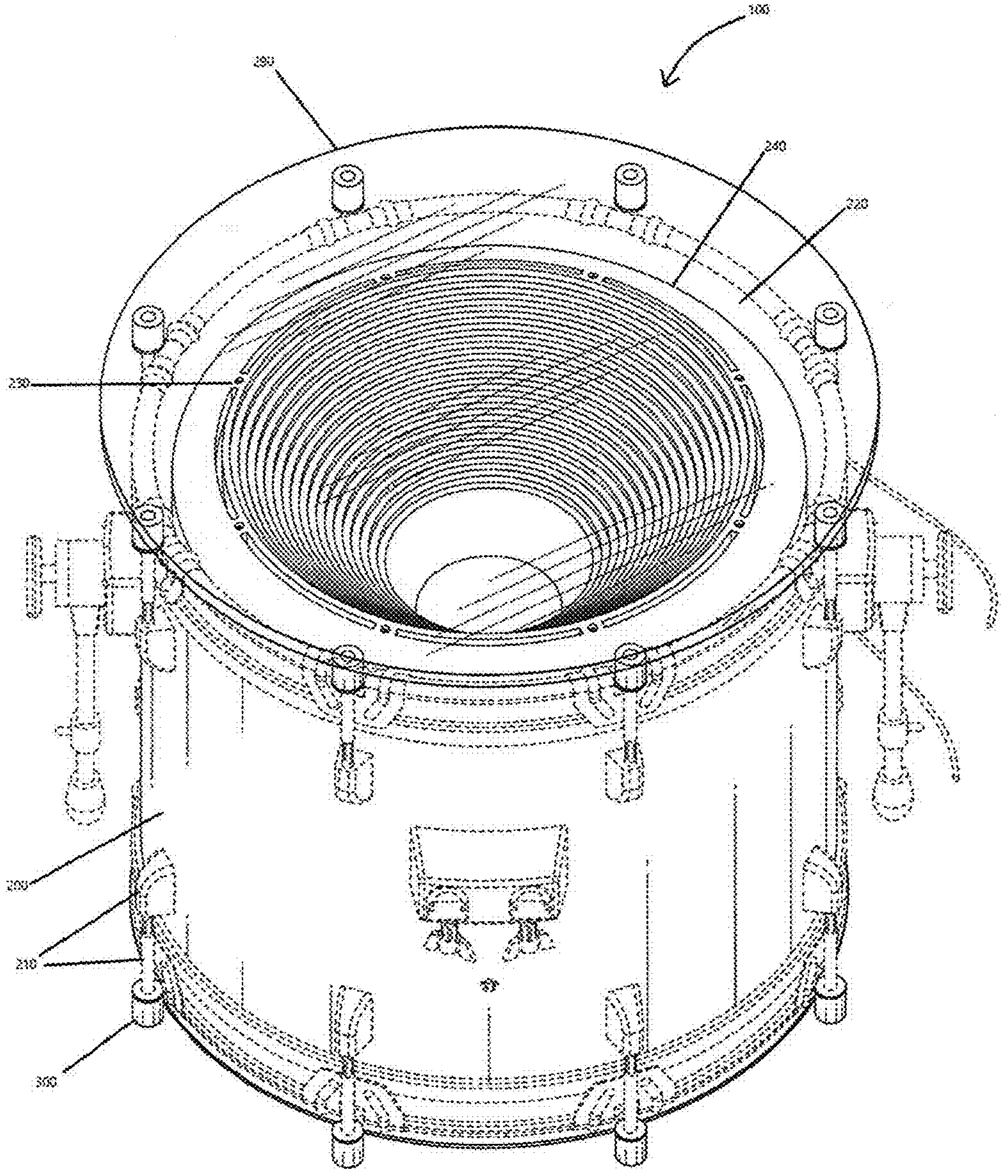
FIG. 1 is a top perspective view of an exemplary drum-mounted furniture-grade speaker driver system according to an embodiment of the present invention.
Figure 2:
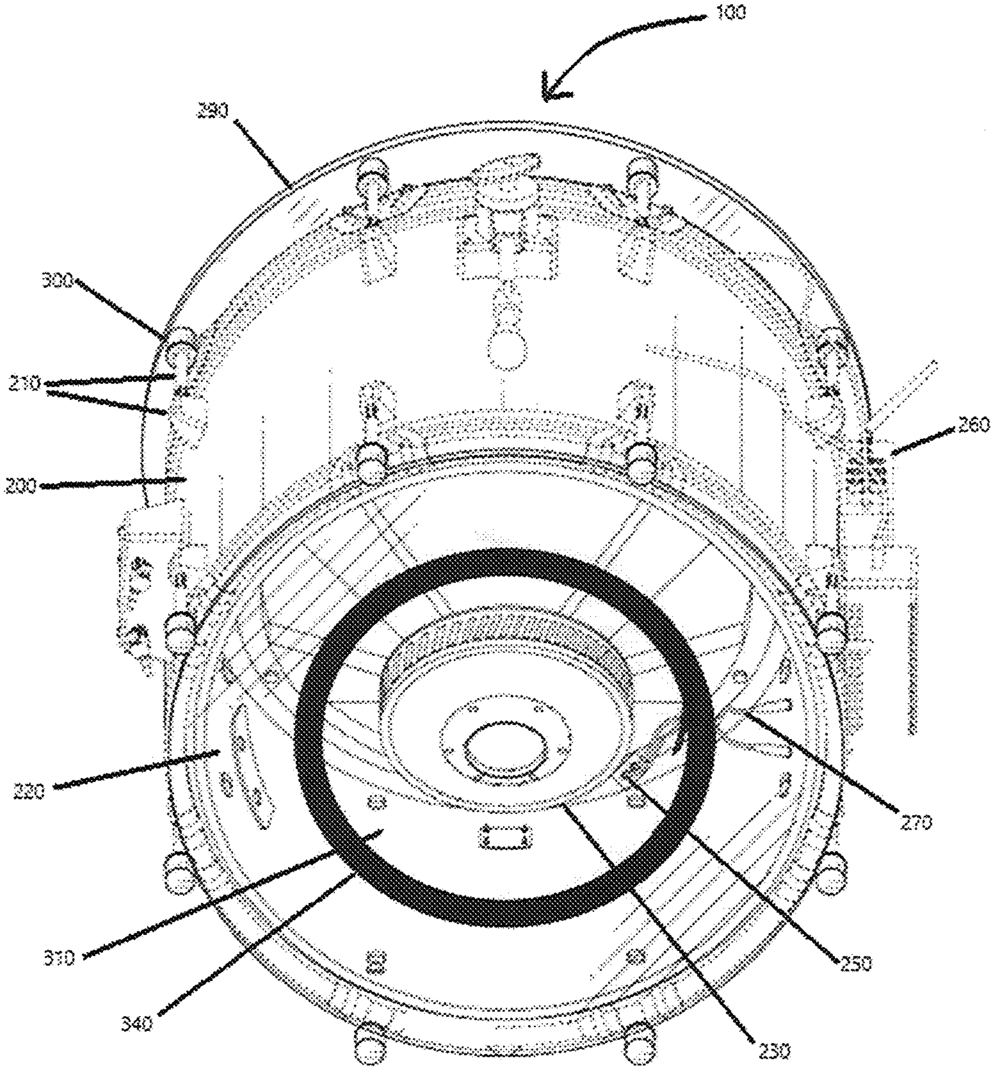
FIG. 2 is a bottom perspective view of an exemplary drum-mounted furniture-grade speaker driver system according to an embodiment of the present invention.
Figure 3:
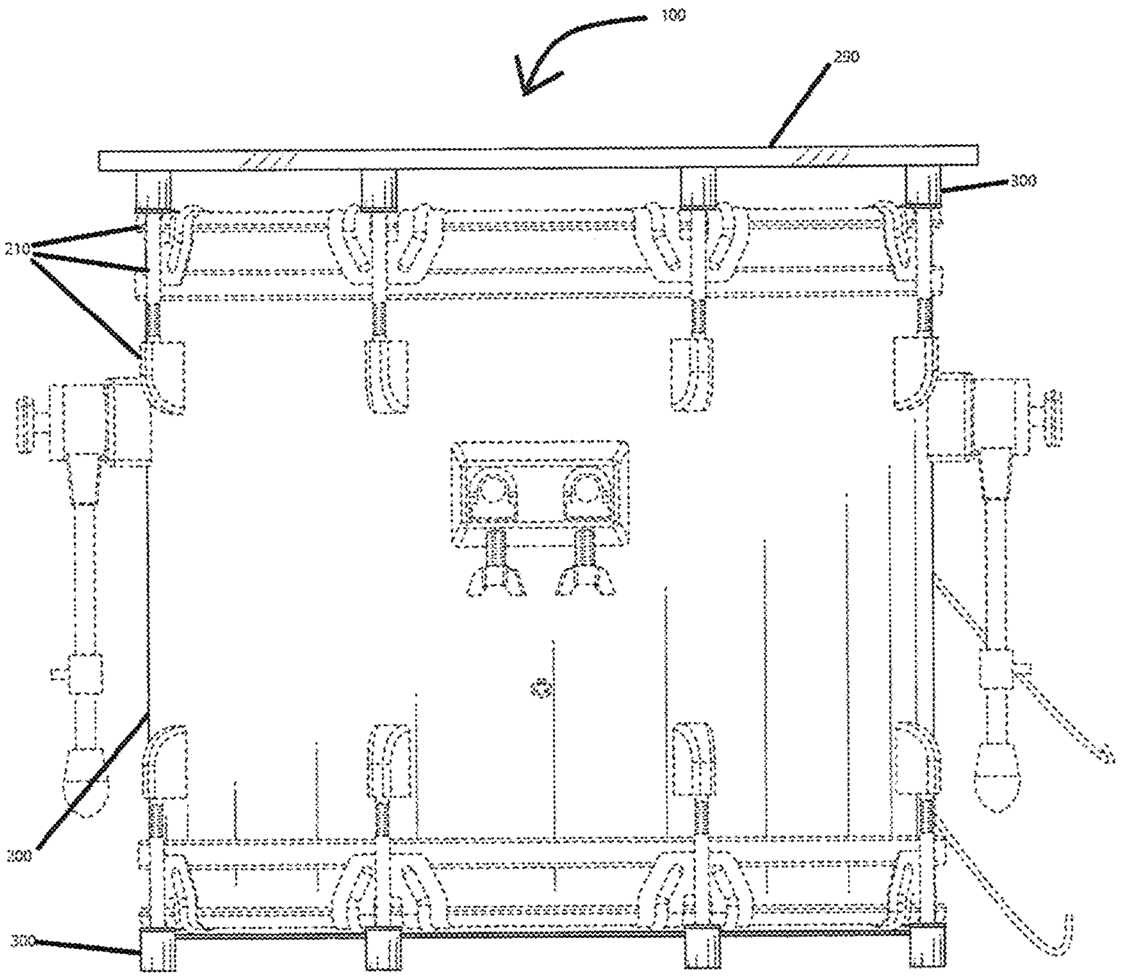
FIG. 3 is a front elevational view of an exemplary drum-mounted furniture-grade speaker driver system according to an embodiment of the present invention.
Figure 4:
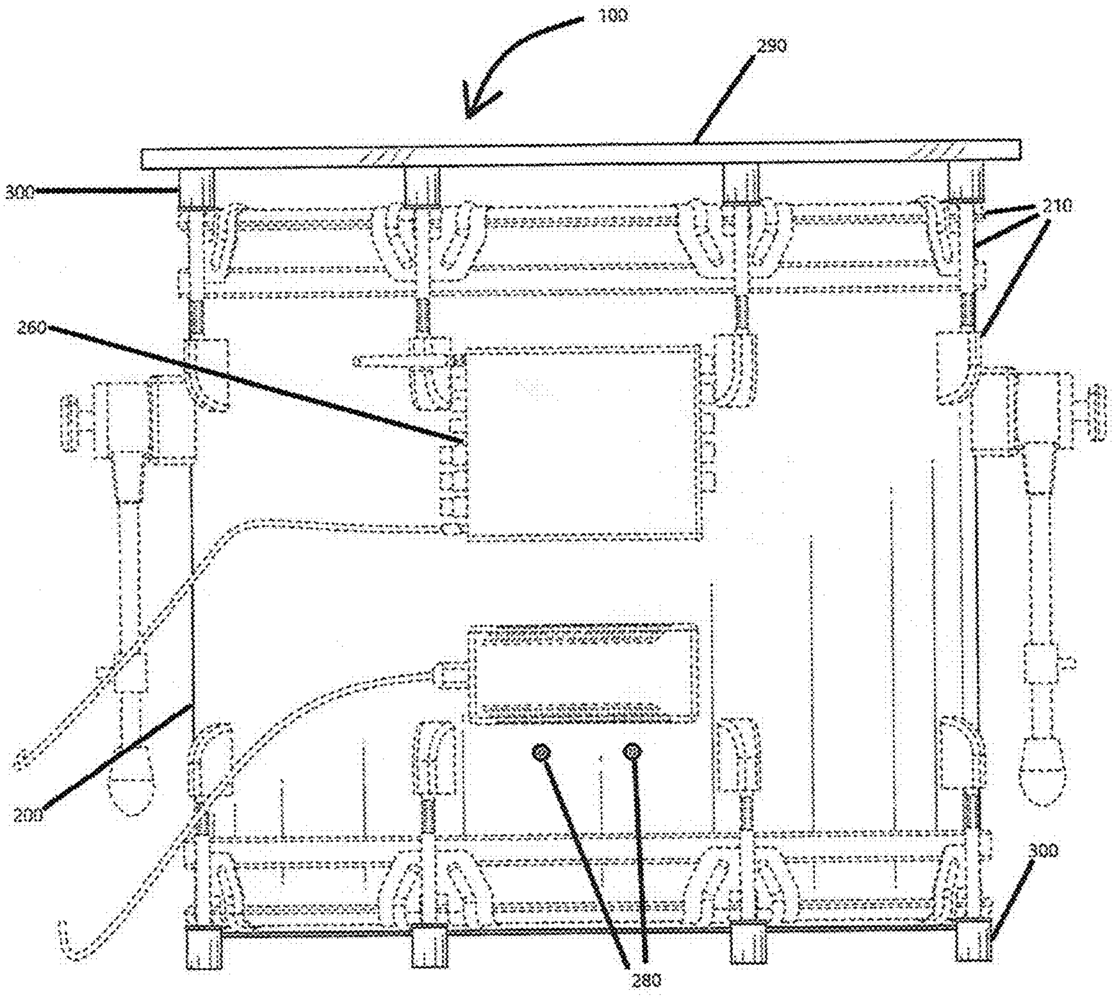
FIG. 4 is a back elevational view of an exemplary drum-mounted furniture-grade speaker driver system according to an embodiment of the present invention.
Figure 5:
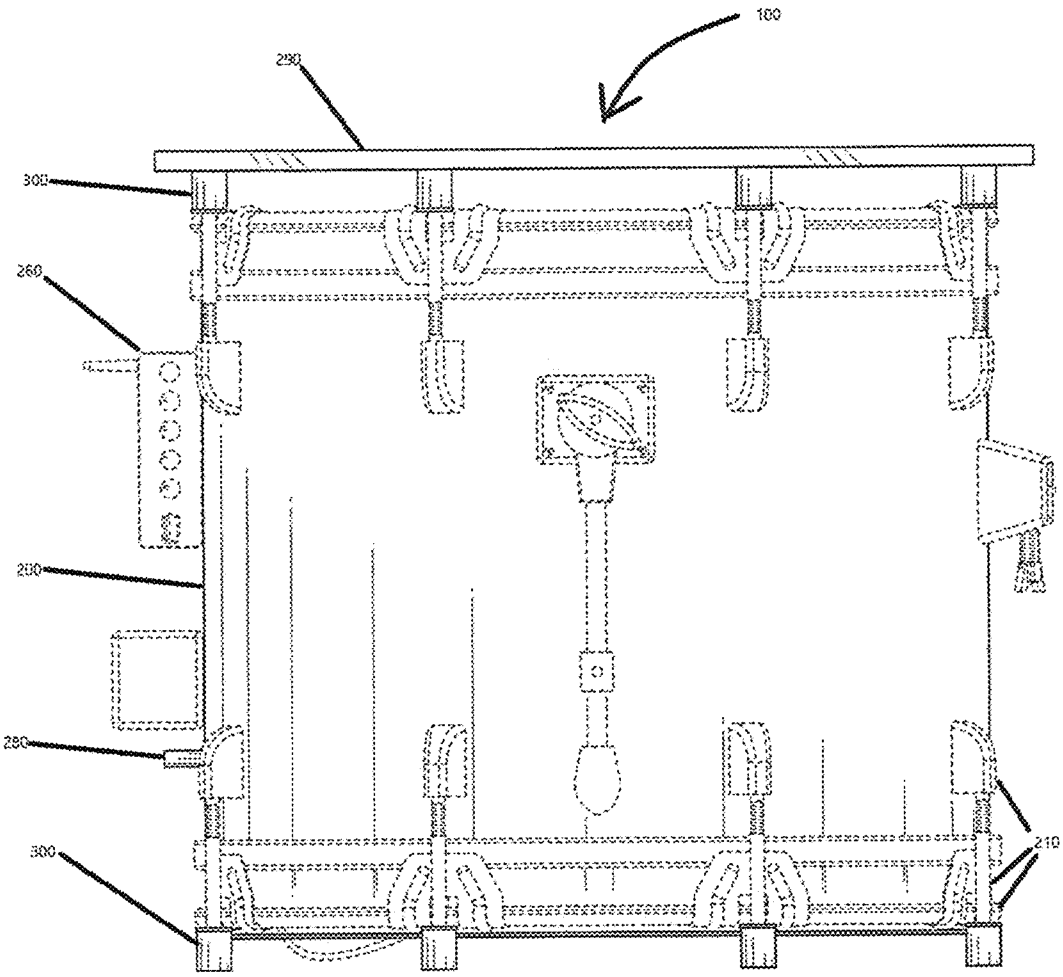
FIG. 5 is a right side elevational view of an exemplary drum-mounted furniture-grade speaker driver system according to an embodiment of the present invention.
Figure 6:
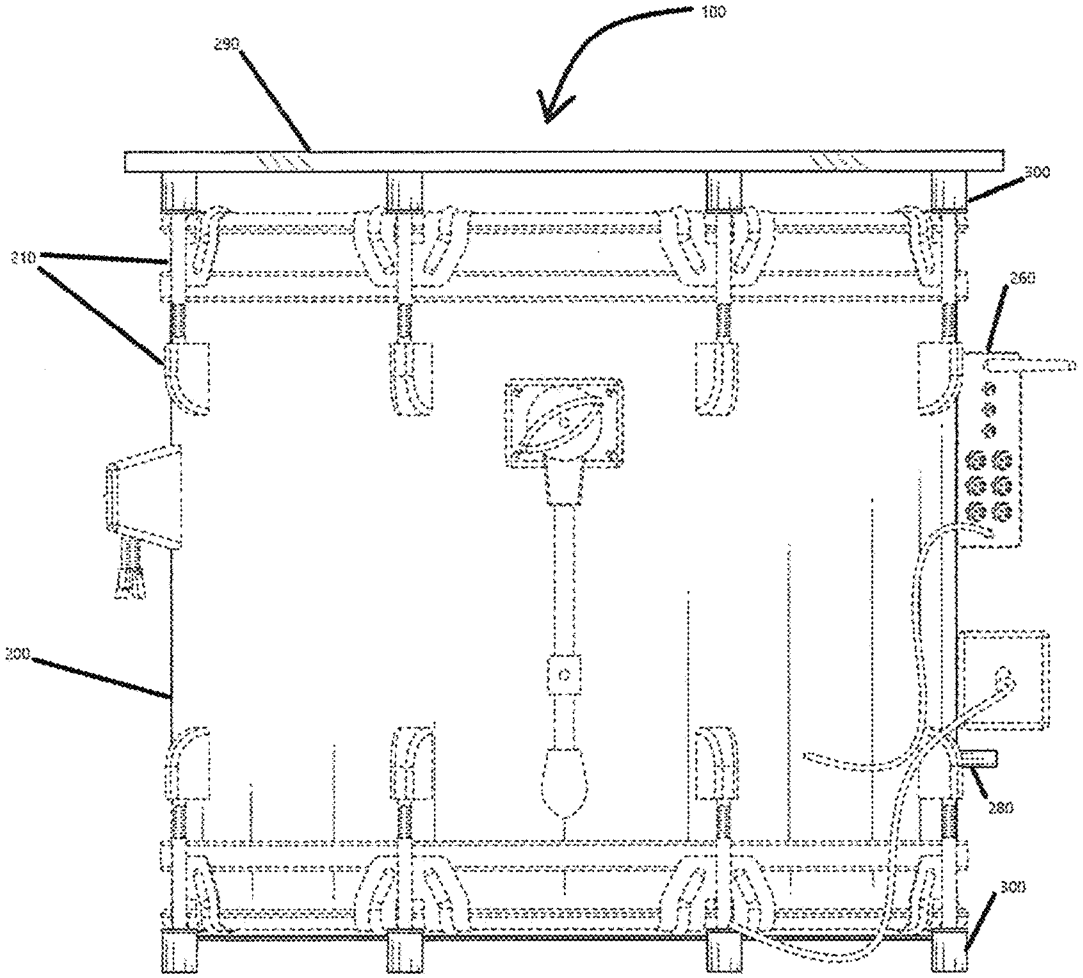
FIG. 6 is a left side elevational view of an exemplary drum-mounted furniture-grade speaker driver system according to an embodiment of the present invention.
Figure 7:
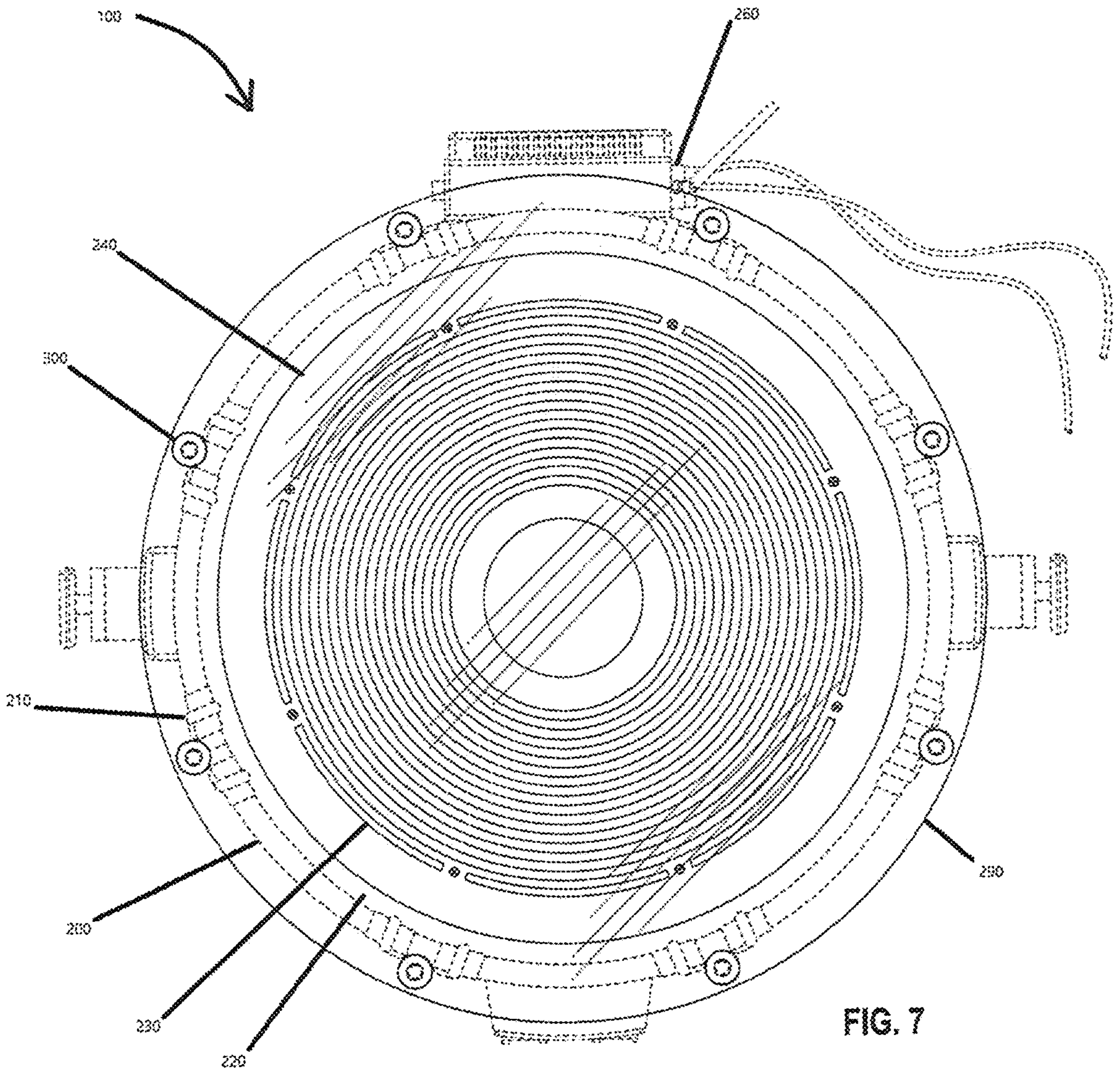
FIG. 7 is a top plan view of an exemplary drum-mounted furniture-grade speaker driver system according to an embodiment of the present invention.
Figure 8:
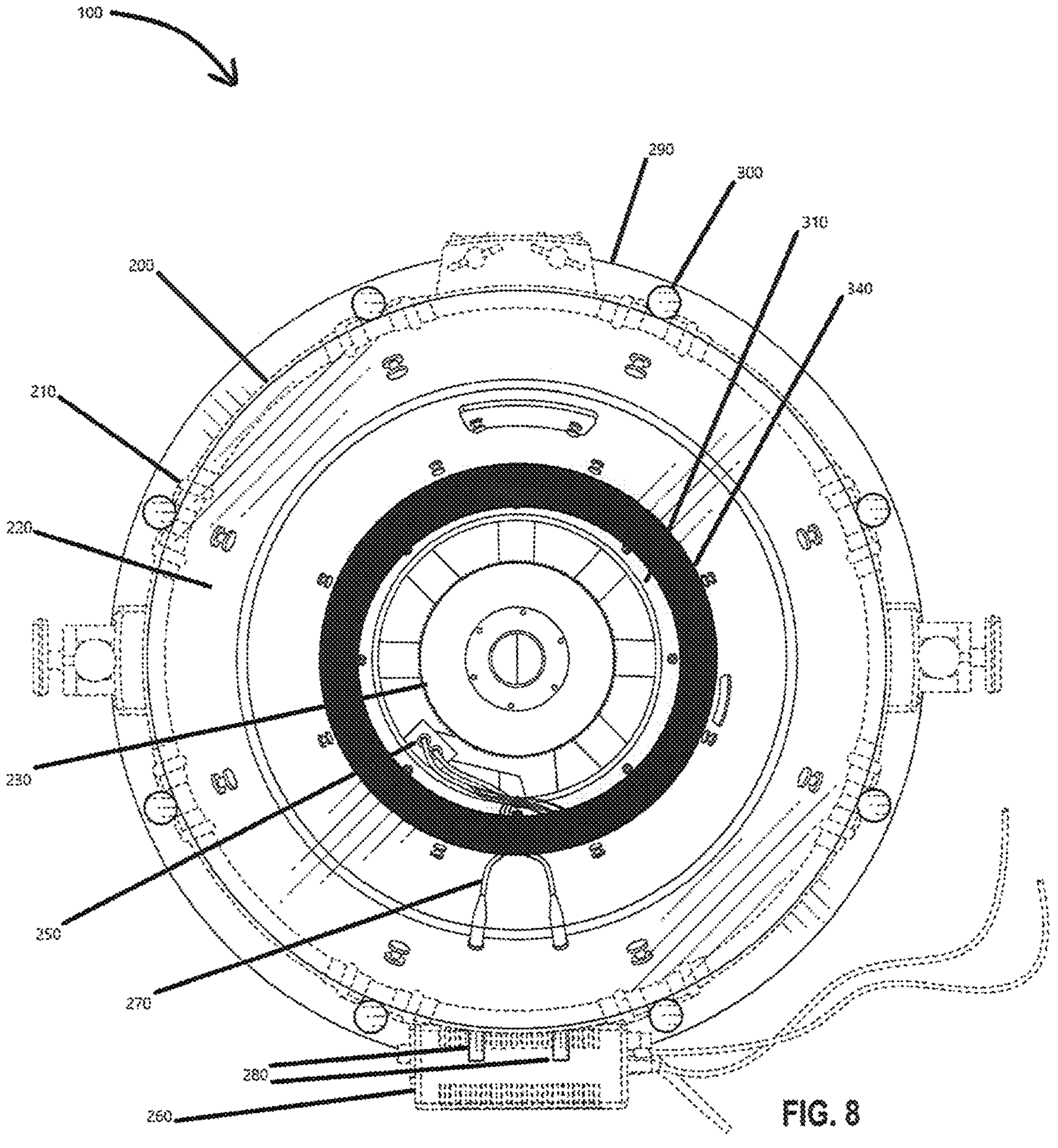
FIG. 8 is a bottom plan view of an exemplary drum-mounted furniture-grade speaker driver system according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred-to object, characteristic, or quality constitutes a majority of the subject of the reference. The meaning of any of these terms is dependent upon the context within which it is used, and the meaning may be expressly modified.

Throughout this disclosure, the present invention may be referred to as a drum-mounted furniture-grade speaker driver system, a speaker system, a sound system, a Coffee Table Subwoofer, a Side Table Subwoofer, a subwoofer, a SpeakerTom, a Cymbalic Tweeter, a speaker, a coffee table, a side table, an accessory furniture piece, a furniture piece, a product, a system, a device, and a method. Furthermore, the present invention may be referred to as relating to generic speaker construction methods and tools. Those skilled in the art will appreciate that this terminology does not affect the scope of the invention.

In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not for limitation.

An embodiment of the invention, as shown and described by the various figures and accompanying text, provides a drum-mounted furniture-grade speaker driver system according to an embodiment of the present invention. The drum-mounted furniture-grade speaker driver system may implement a system to provide a drum-mounted furniture-grade speaker driver in a vibration-isolating, structurally sound and visually pleasing manner.

After much research and development, the drum-mounted furniture-grade speaker driver system was designed to produce powerful audio speakers that can double as unique, music-themed accessory furniture pieces by mating a new, used or vintage drum with a powerful speaker driver. This speaker/drum combination creates a unique, decorative, yet highly functional design for a speaker and stereo system for both home and commercial applications. Due to its novel appearance and high-fidelity function, this inventive design fulfills a market need for sound systems that entertain the consumer on both an audible and visual level. This invention lends itself to incorporation into home music rooms, clubs and music venues that rely on quality high-fidelity sound along with the music-related visual impact of a live performance.

The present invention is made up of at least one acoustic drum shell 200 of any size along with hardware 210 for mounting and attachment of at least one drumhead 220 to the drum shell, at least one drumhead (the at least one drumhead may be perforated to accept mounting of at least one speaker driver 230), at least one speaker driver (with or without electronic frequency crossover network), at least one reinforcement ring 240 sized to span an area between an interior perimeter of an opening in the at least one drumhead sized to permit mounting of at least one speaker driver and an outer perimeter of the at least one speaker driver, two electronic speaker terminals 250 to connect the at least one speaker driver to an amplifier 260 (outboard or internally powered) and speaker wire 270 and external terminals 280 (+/−) to attach all electronic connections within the speaker drum cabinet. In some embodiments of the present invention, an opening defined as a port 310 may be provided in the at least one drumhead opposite the at least one drumhead in which the speaker driver is mounted. The port may have at least one reinforcement ring 340 adhered to a perimeter thereof.

Referring more specifically to FIGS. 1 through 8, the drum-mounted furniture-grade speaker driver system 100, according to an embodiment of the present invention, will now be discussed. The system 100 may include at least one acoustic drum shell 200 of any size along with hardware 210 for mounting and attachment of at least one drumhead 220 to the drum shell, at least one drumhead (the at least one drumhead may be perforated to accept mounting of at least one speaker driver 230), at least one speaker driver (with or without electronic frequency crossover network), at least one reinforcement ring 240 sized to span an area between an interior perimeter of an opening in the at least one drumhead sized to permit mounting of at least one speaker driver and an outer perimeter of the at least one speaker driver, two electronic speaker terminals 250 to connect the at least one speaker driver to an amplifier (outboard or internally powered) and speaker wire 270 and external terminals 280 (+/−) to attach all electronic connections within the speaker drum cabinet.

The at least one reinforcement ring 240 is cut to the diameter and width of the speaker frame mounting area. This reinforcement ring 240 is essentially a fixed gasket that is adhered to the at least one drumhead 220 with adhesive prior to cutting the drumhead to accept the at least one speaker driver 230. The at least one reinforcement ring's 240 function is to reinforce the now perforated at least one drumhead 220 to prevent tearing and rupture once the at least one speaker driver 230 is mounted into the drumhead and to accept the fasteners with which the speaker driver is mounted to the drumhead. Mounting holes are then drilled into the mounted at least one reinforcement ring 240 and the at least one drumhead 220 which match the mounting holes of the at least one speaker driver 230 being mounted. The result of this mounting system is to virtually eliminate vibrations of the speaker driver's 230 frame from being transmitted to the speaker cabinet (in this case the drum shell 200) to prevent unwanted harmonic distortion and resonances. In a preferred embodiment of the present invention, the at least one reinforcement ring 240 is cut from a 0.06" ABS Plastic Sheet and the reinforcement ring is adhered to the at least one drumhead 220 with double-sided tape. In some embodiments of the present invention a first reinforcement ring 240 is adhered to an outer surface of the at least one drumhead 220 and a second reinforcement ring is adhered to an inner surface of the at least one drumhead.

In a preferred embodiment of the present invention, the at least one acoustic drum shell 200 is a bass (kick) drum and the at least one speaker driver 230 is a subwoofer speaker driver. The bass drum is turned 90° onto its front (batter) drumhead 220, with its back (resonant) drumhead 220 facing up toward the listener. The at least one speaker driver 230 is installed and secured into a cutout (round) of the bass drum's back (resonant) drumhead 220 reinforced by at least one reinforcement ring 240. The at least one speaker driver 230 and drumhead 220 combination are then reinstalled onto the bass drum shell 200 (as you would normally secure the drumhead alone), and is wired 270 to accept an amplifier's 260 audio power output. This configuration now acts as a tuned speaker cabinet (both decorative and functional) for the at least one speaker driver 230. This is done to improve the sound fidelity and dispersion of the at least one speaker driver's 230 output, while at the same time presenting a unique and artistic form. With the at least one speaker driver 230 positioned perpendicular to a floor surface, low bass frequencies are directed downward toward the floor through the front (now bottom) drumhead. This design allows the lowest bass frequencies to be down-fired to the floor to project the lowest bass notes to permeate the listening area. The mounting of the at least one speaker driver 230 component onto the reinforced drumhead 220 provides substantial vibration isolation of low (bass) frequencies transmitted by the speaker frame to the drum shell 200 (speaker cabinet) which can otherwise lead to cabinet resonance sound distortion. The bass drum is then topped off with a vibration isolated tabletop 290 to make it functional as furniture. The vibration isolation of the tabletop 290 is facilitated by the use of mounting support risers 300 to elevate the tabletop above the speaker driver 230 and to elevate the bottom of the Coffee Table Subwoofer off the floor to allow mid bass sounds to emit while not vibrating the tabletop. Once the at least one speaker driver 230 is installed, the tension rods 210 are fitted with vibration isolating risers 300 to elevate the drum off the floor at just the right height for in-phase sound dispersion and optimum acoustic performance. The upper tension rods 210 are fitted with the same isolating risers 300 to prevent unwanted vibrations from transferring to the tabletop. The result is a subwoofer/coffee table defined as a Coffee Table Subwoofer which provides an incredible "live performance" feel to a listener's music listening experience with excellent sound fidelity, reproducibility, functionality and pleasing aesthetics. In a preferred embodiment of the present invention, the tabletop 290 is tempered glass with a thickness in the range of ¼" to ¾" and the risers 300 are rubber.

The Coffee Table Subwoofer is a passive subwoofer which will accept amplified power from an external power amp, or may be paired with an onboard amplifier system attached to the Coffee Table Subwoofer outer shell wall. The onboard amplifier system affords the capability of powering both the Coffee Table Subwoofer and at least one external stereo speaker. The Coffee Table Subwoofer can be paired with matching full range hi-fidelity SpeakerToms, and/or Cymbalic Tweeters which are available in several mounting configurations.

In some embodiments of the present invention the at least one acoustic drum shell 200 is a floor tom drum and the at least one speaker driver 230 is a subwoofer driver. The at least one speaker driver 230 is installed and secured into a cutout (round) of the floor tom drum's top (batter) drumhead 220 reinforced by at least one reinforcement ring 240. The at least one speaker driver 230 and drumhead 220 combination are then reinstalled onto the floor tom drum shell (as you would normally secure the drumhead alone), and is wired 270 to accept an amplifier's 260 audio power output. This configuration now acts as a tuned speaker cabinet (both decorative and functional) for the at least one speaker driver 230. This is done to improve the sound fidelity and dispersion of the at least one speaker driver's 230 output, while at the same time presenting a unique and artistic form. With the at least one speaker driver 230 positioned perpendicular to a floor surface, low bass frequencies are directed downward toward the floor through the bottom (resonant) drumhead 220. This design allows the lowest bass frequencies to be down-fired to the floor to project the lowest bass notes to permeate the listening area. The mounting of the at least one speaker driver 230 component onto the reinforced drumhead 220 provides substantial vibration isolation of low (bass) frequencies transmitted by the speaker frame to the drum shell (speaker cabinet) which can otherwise lead to cabinet resonance sound distortion. The floor tom drum is then topped off with a vibration isolated tabletop 290 to make it functional as furniture. The vibration isolation of the tabletop 290 is facilitated by the use of mounting support risers 300 to elevate the tabletop above the speaker driver 230 and to elevate the bottom of the Side Table Subwoofer off the floor to allow mid bass sounds to emit while not vibrating the tabletop. Once the at least one speaker driver 230 is installed, the tension rods 210 are fitted with vibration isolating risers 300 to elevate the drum off the floor at just the right height for in-phase sound dispersion and optimum acoustic performance. The upper tension rods 210 are fitted with the same isolating risers 300 to prevent unwanted vibrations from transferring to the tabletop. The result is a subwoofer/coffee table defined as a Side Table Subwoofer which provides an incredible "live performance" feel to a listener's music listening experience with excellent sound fidelity, reproducibility, functionality and pleasing aesthetics.

The Side Table Subwoofer is a passive subwoofer which will accept amplified power from an external power amp, or may be paired with an onboard amplifier system attached to the Side Table Subwoofer outer shell wall. The onboard amplifier system affords the capability of powering both the Side Table Subwoofer and at least one external stereo speaker. The Side Table Subwoofer can be paired with matching full range hi-fidelity SpeakerToms, and/or Cymbalic Tweeters which are available in several mounting configurations.

The drum-mounted furniture-grade speaker driver system 100 is available in a variety of customizable configurations for a variety of listening and placement options. The V-Kit System is designed for intimate, close proximity listening in smaller spaces. The CymbalTree Configuration is suited for larger spaces where the ambient "depth-of-field" may be maximized, while providing ambient lighting suited for home, club or studio. The Suspended SpeakerToms Configuration is best suited for multi-dimensional sound dispersion while placing the speakers off the floor for safety and floorspace optimization, as well as providing a cool look with other audio & video components.

The V-Kit System is comprised of the Coffee Table Subwoofer, a pair of SpeakerToms and Cymbalic Tweeters. In some embodiments of the present invention the V-Kit System is comprised of the Side Table Subwoofer, a pair of SpeakerToms and Cymbalic Tweeters. A SpeakerTom utilizes a rack tom drum as a speaker housing for a full range speaker driver. The rack tom drum is turned 90° so that its front (batter) drumhead faces toward the listener parallel to the floor. At least one audio speaker driver is installed and secured into a reinforced (round) cutout of the rack tom drum's front (batter) drumhead. The at least one speaker driver and drumhead combination are then reinstalled onto the rack tom drum shell (as you would normally secure the drumhead alone), and is wired to accept an amplifier's audio power output. This configuration now acts as a tuned speaker cabinet (both decorative and functional) for the at least one speaker driver. This is done to improve the sound fidelity and dispersion of the at least one speaker driver's output, while at the same time presenting a unique and artistic form. The mounting of the at least one speaker driver component onto the reinforced drumhead provides substantial vibration isolation of low (bass) frequencies transmitted by the speaker frame to the drum shell (speaker cabinet) which can otherwise lead to cabinet resonance sound distortion. A CymbalicTweeter utilizes a crash cymbal or ride cymbal as a speaker housing for a high frequency dome tweeter. This system is designed to use the original rack tom arms to deploy the SpeakerTom Speakers and Cymbalic Tweeters in a "V" configuration for mounting in close proximity to the Coffee Table Subwoofer. In some embodiments of the present invention the system is designed to use the original rack tom arms to deploy the SpeakerTom Speakers and Cymbalic Tweeters in a "V" configuration for mounting in close proximity to the Side Table Subwoofer. This configuration is best designed for intimate listening settings at home, in the club, at a bar or in studio use.

The CymbalTree Configuration is designed to allow for separation between the placement of the Coffee Table Subwoofer and the full range SpeakerToms in a listening area. In some embodiments of the present invention the CymbalTree Configuration is designed to allow for separation between the placement of the Side Table Subwoofer and the full range Speaker toms in a listening area. This allows for greater depth and sound dispersion in larger spaces in the home, in the club, at the bar or in the studio setting. With the subwoofer closer to the listener and the SpeakerToms further away, it creates a three-dimensional sound experience.

Figure 9:
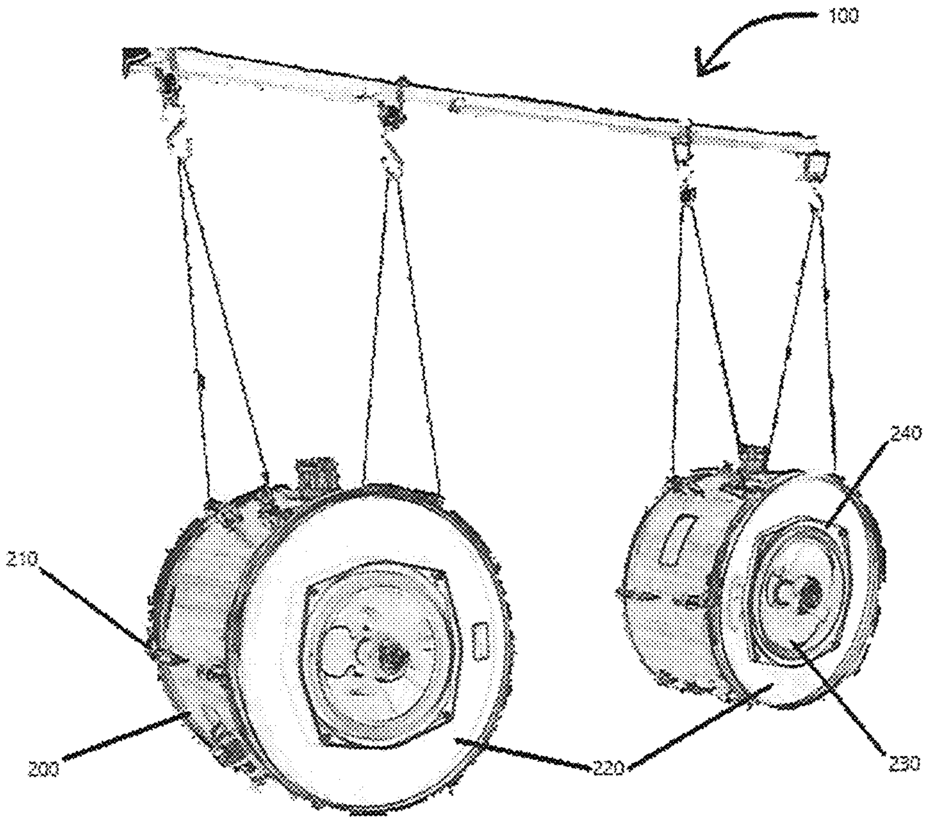
FIG. 9 is a left side perspective view of an exemplary drum-mounted furniture-grade speaker driver system according to an embodiment of the present invention.

In some embodiments of the present invention the at least one drumhead 220 of the drum shell may contain multiple speaker drivers 230 to obtain partial or full-spectrum sound output, depending on the desired sound and application. Therefore, there may be speaker drivers 230 mounted on the same or opposing drumheads 220 in the same drum shell 200 to create the desired audio sound, dispersion and/or visual effect. The drum-mounted furniture-grade speaker driver system 100 may also be displayed and mounted in several configurations. In some embodiments of the present invention the drum-mounted furniture-grade speaker driver system 100 is positioned with the speaker driver 230 perpendicular to the floor to radiate sounds upwards and downwards into the listening area to promote even and accurate bass frequencies' sound dispersion (with or without a glass table-top). In other embodiments of the present invention the drum-mounted furniture-grade speaker driver system 100 is mounted on support arms and/or stands with the speaker driver parallel to the floor to direct sounds horizontally into the listening area, as well as toward reflective walls, floor and ceiling. In still other embodiments of the present invention the drum-mounted furniture-grade speaker driver system 100 may be suspended by brackets, wires, ropes or chains mounted from the ceiling of the listening area to provide higher sound dispersion towards the listeners, as depicted in FIG. 9.

In a preferred embodiment of the present invention, the drum-mounted furniture-grade speaker driver system 100 is made up of the following components: at least one acoustic drum shell 200 from 8" to 48" in diameter; mounting hardware 210 (lugs, lug bolts and metal head mounting ring) for attachment of at least one drumhead 220 to the at least one drum shell, at least one drumhead in the appropriate size for the at least one drum shell (the at least one drumhead may be perforated to accept mounting of at least one speaker driver 230); at least one speaker driver ranging from 1" to 24" in diameter (with or without electronic frequency crossover network), at least one reinforcement ring 240 sized to span the area between an interior perimeter of an opening in the at least one drumhead sized to permit mounting of at least one speaker driver and an outer perimeter of the at least one speaker driver, two electronic speaker terminals to connect the at least one speaker driver to an amplifier 260 (outboard or internally powered) and speaker wire 270 and external terminals 280 (+/−) to attach all electronic connections within the speaker drum cabinet and to any external power amplifier powering the system.

This combination of high-end speaker drivers 230 (from companies like JBL and Infinity) matched with quality percussion instruments 200 (from companies like Ludwig, Yamaha, Pearl and Pacific Drums and Percussion) provides for a dynamic reproduction of the entire audio spectrum, like one might experience in a live concert setting. The listener will actually see, feel and hear the drums and perceive the drums as the actual source of the dramatic sounds the listener hears. The sound characteristics produced by the drum-mounted furniture-grade speaker driver system 100 are incredibly accurate with ultra-wide dispersion of deep bass frequencies throughout the room via its bottom (resonant) drum head. The speaker's back-wave sound is purposely directed to the floor via the resonant head to use the room's floor substrate to emanate the sounds throughout the listening area. This subwoofer does NOT need to be placed in a corner of the room to optimize the bass. With the subwoofer now closer to the listener, you get true dimensionality of sound as you would in a live performance The present invention is unique in that it is structurally different from other known devices or solutions. More specifically, the present invention is unique due to its marked reduction in speaker frame resonance distortion which is usually transferred to a speaker cabinet by the speaker driver, and manifests itself in perceived bass distortion. This undesirable distortion is virtually eliminated due to the unique mounting of the speaker driver onto the reinforced drumhead, thereby creating a vibration isolation from the drum shell which functions as the speaker cabinet. The furniture piece drum-mounted speaker system uses the drum's batter drumhead as the speaker's baffle. The drum's plastic batter drumhead substrate isolates vibrations and resonances of the speaker frame from transferring to the speaker cabinet. This allows the speaker driver to perform optimally, without resonant feedback from the cabinet or other components of the speaker cabinet and mounting system.

The Coffee Table Subwoofer is also unique in that it doubles as a functional piece of furniture as well as a high-fidelity speaker component. The floating mount design of the speaker driver allows for sound isolation of the speaker's frame from being transmitted to the cabinet, and hence to the glass tabletop. This vibration isolation is further enhanced by the use of rubber mounting support risers to elevate the tempered glass tabletop above the speaker driver and to elevate the bottom of the Coffee Table Subwoofer off the floor to allow mid bass sounds to emit while not vibrating the glass top. Once the at least one speaker driver is installed, the tension rods are fitted with vibration isolating risers to elevate the drum off the floor at just the right height for in-phase sound dispersion and optimum acoustic performance. The upper tension rods are fitted with the same isolating risers to prevent unwanted vibrations from transferring to the thick tempered glass tabletop. The space (gap) between a top surface of the drum shell and a bottom surface of the glass tabletop allows for low and mid-bass sounds to escape by emanating from under the glass tabletop without vibrating the glass itself. This isolation allows for virtually no vibrations to be transmitted to the glass tabletop, allowing it to be used as a table without concern for resonances and reverberations affecting items placed on the tabletop.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted, for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are, unless otherwise stated, used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

That which is claimed is:

1. A drum-mounted furniture-grade speaker driver system comprising:

At least one hollow cylindrical acoustic drum shell with openings on opposite ends thereof;

at least one drumhead mounted in a first opening of the drum shell;

at least one speaker driver mounted in the at least one drumhead;

an opening in the at least one drumhead sized to accept the at least one speaker driver;

at least one reinforcement ring sized to span an area between an interior perimeter of the opening in the at least one drumhead and an outer perimeter of the at least one speaker driver;

at least one electronic speaker terminal on the at least one speaker driver;

a length of speaker wire to electrically connect the at least one speaker driver to an amplifier; and a length of speaker wire to electrically connect the amplifier to at least one external terminal on an exterior surface of the at least one drum shell.

2. The drum-mounted furniture-grade speaker driver system according to claim 1 wherein the drum shell is selected from the group consisting of a bass drum shell, a floor tom drum shell, a snare drum shell and a rack tom drum shell and wherein the speaker driver is selected from the group consisting of a subwoofer, a full range speaker driver, and a high frequency dome tweeter speaker driver.

3. The drum-mounted furniture-grade speaker driver system according to claim 2 wherein the drum-mounted furniture-grade speaker driver system further comprises at least one drumhead mounted in a second opening of the drum shell opposite the first opening of the drum shell.

4. The drum-mounted furniture-grade speaker driver system according to claim 3 wherein the at least one drumhead mounted in the second opening of the drum shell further comprises an opening defined as a port having at least one reinforcement ring adhered to a perimeter of the port.

5. The drum-mounted furniture-grade speaker driver system according to claim 4 wherein the speaker driver has an electronic frequency crossover network.

6. The drum-mounted furniture-grade speaker driver system according to claim 5 wherein the amplifier is internally powered and is attached to an outer surface of the drum shell.

7. The drum-mounted furniture-grade speaker driver system according to claim 1 wherein the drum shell comprises a bass drum shell oriented vertically so that the first opening is at a top end of the drum shell and the second opening is at a bottom end of the drum shell, wherein the speaker driver is a subwoofer, wherein a plurality of lugs and a plurality of lug bolts on a perimeter of the top end of the drum shell secure a mounting ring on the perimeter of the top end of the drum shell to mount the first drumhead in the first opening of the drum shell, wherein a plurality of lugs and a plurality of lug bolts on a perimeter of the bottom end of the drum shell secure a mounting ring on the perimeter of the bottom end of the drum shell to mount the second drumhead in the second opening of the drum shell, wherein a plurality of mounting support risers is affixed to a top end of the lug bolts on the perimeter of the top end of the drum shell defined as upper tension rods, wherein a table top rests on a top surface of the plurality of mounting support risers, and wherein a plurality of vibration isolating risers is affixed to a bottom end of the lug bolts on the perimeter of the bottom end of the drum shell defined as lower tension rods.

8. The drum-mounted furniture-grade speaker driver system according to claim 7 wherein the at least one reinforcement ring comprises a first reinforcement ring and a second reinforcement ring, wherein the first reinforcement ring is adhered to an outer surface of the first drumhead and wherein the second reinforcement ring is adhered to an inner surface of the first drumhead.

9. The drum-mounted furniture-grade speaker driver system according to claim 8 wherein the at least one port reinforcement ring comprises a first port reinforcement ring and a second port reinforcement ring and wherein the first port reinforcement ring is adhered to an inner surface of the second drumhead and the second port reinforcement ring is adhered to an outer surface of the second port reinforcement ring.

10. The drum-mounted furniture-grade speaker driver system according to claim 9 wherein the at least one reinforcement ring is cut from a 0.06" thick ABS Plastic Sheet, wherein the table top is tempered glass with a thickness in the range of ¼" to ¾", and wherein the risers are rubber.

* * * * *